(No Model.)

M. C. NILES.
REVOLVING PLOW.

No. 269,096. Patented Dec. 12, 1882.

Witnesses
W. C. Coiles
Jno. C. MacGregor

Inventor
Milton C. Niles
By Osbrun & Thacher
Attorneys

N. PETERS, Photo-Lithographer, Washington, D. C.

UNITED STATES PATENT OFFICE.

MILTON C. NILES, OF OAK PARK, ILLINOIS.

REVOLVING PLOW.

SPECIFICATION forming part of Letters Patent No. 269,096, dated December 12, 1882.

Application filed July 17, 1882. (No model.)

*To all whom it may concern:*

Be it known that I, MILTON C. NILES, a citizen of the United States, residing at Oak Park, in the county of Cook and State of Illinois, have invented certain new and useful Improvements in Revolving Plows, which are fully set forth in the following specification, reference being had to the accompanying drawings, in which—

Figure 1:
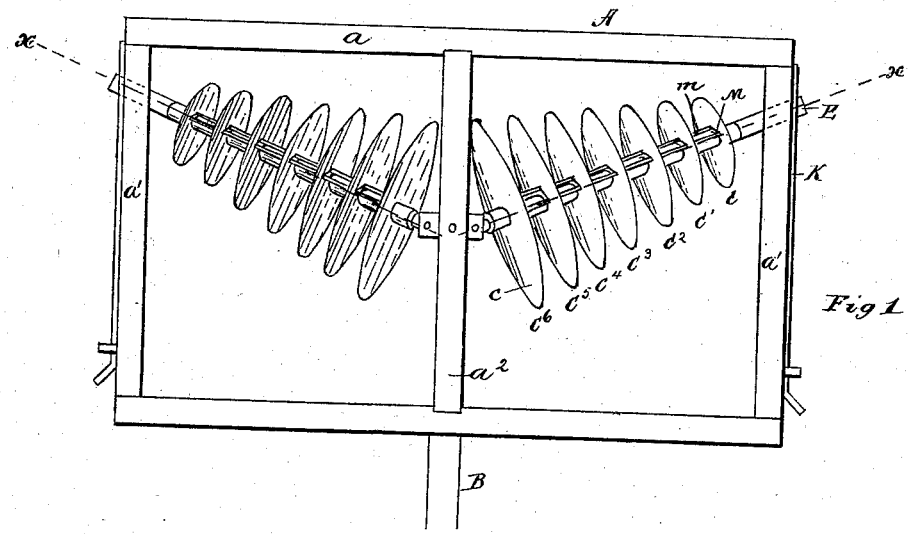
Figure 2:
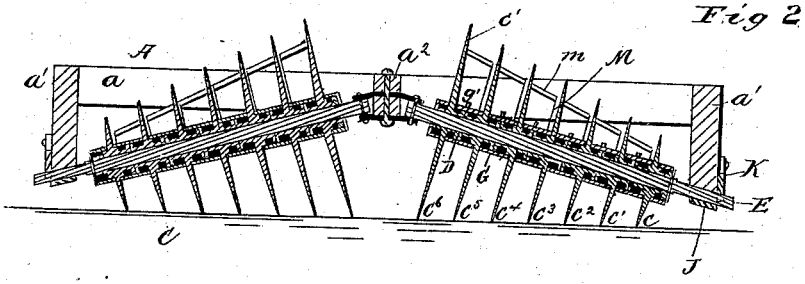
Figure 3:
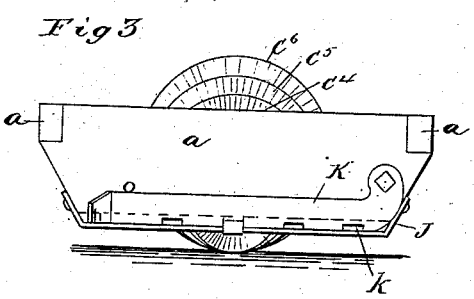
Figures 6, 7:
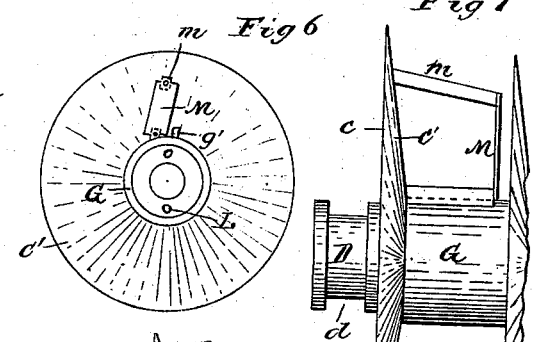
Figure 4:
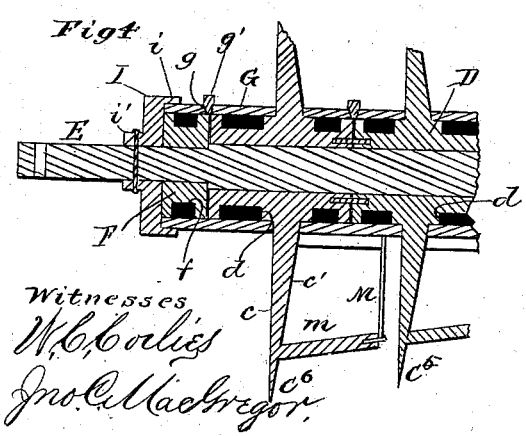
Figure 5:
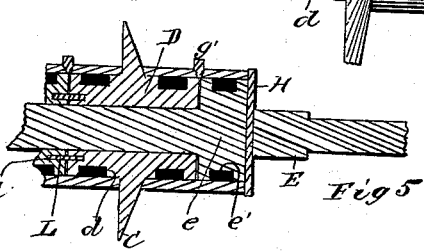

Figure 1 represents a plan view of a machine embodying my invention; Fig. 2, a section of the same, taken on the line $x\,x$, Fig. 1; Fig. 3, an end elevation of the same; Fig. 4, a detail section, on an enlarged scale, taken at the inner end of one of the shafts; Fig. 5, a similar section, on the same enlarged scale, taken at the outer end of the same shaft; Fig. 6, an elevation, on the same enlarged scale, of the back of one of the disks; and Fig. 7, a detail front elevation, on the same enlarged scale, showing a disk and the scraper attached.

My invention relates to that class of machines in which the plowing is done by rotary disks, the machines being sometimes called "rotary plows" and sometimes "rotary harrows" or "disk-harrows." In implements of this kind the disks are arranged in a series on the same shaft, and heretofore all the disks in the series have been made of the same size, the work being accomplished by setting the shaft or shafts at an angle to the line of progression. Under this arrangement, when the working-faces of the disks are plain, the soil is broken up and crowded out, but not turned much, and in order to get the turning action of the mold-board of a plow these faces are made concave or dishing, which shape, however, is open to some objection, as, if the soil is damp, the disks will clog, and those of a dishing shape are not easily cleaned.

My improvement consists in arranging two or more disks of different sizes to form a series, all the disks of which will rest upon the ground, and inclining all the disks in the same series in the same direction, either right or left from a perpendicular to the ground on which the series rests.

It also consists in the combination of two series of disks arranged as stated above, with the axes of the series inclined to each other at an angle from a horizontal line at right angles to the line of draft, whereby a mold-board effect is obtained as the disks are drawn forward.

It also consists in several special features of construction, by which the main elements of my invention may be carried out in one way.

I will proceed to describe in detail the construction and organization of a machine in which I have carried out my invention in one way, and will then point out definitely in the claims the special improvements which I believe to be new, and for which I wish to obtain the protection of a patent.

In the drawings, A represents the frame, of any ordinary construction, being here shown of rectangular form, having side beams, $a$, end beams, $a'$, and a cross-beam, $a^2$, running from the front to the back side about the middle of the frame. The frame is provided with a tongue or pole, B, attached thereto in any suitable manner.

The plowing-disks are regularly graduated in size, so that the series of seven on each shaft, (shown in the drawings commencing with the smallest,) C, C', $C^2$, $C^3$, $C^4$, $C^5$, and $C^6$, will represent cross-sections of the same cone taken at regular intervals, and these disks, mounted on a shaft at regular intervals, will lie within a circumscribed cone. The working-faces $c$ of the disks are plain. The backs $c'$ are slightly convex, this shape being given to them by gradually increasing the thickness from the edge toward the center of each disk. They are also provided with hubs D, projecting on each side of the disks, and either may be made separate, with the disks attached thereto, or cast with the latter. The length of the hubs is intended to be equal to the distance at which the cutting-edges of the disks should be separated. The hub on each side of the disk is provided with an annular groove, $d$, cut therein. The disks of each series are mounted one after the other loosely on a shaft, E, the disk-hubs abutting against each other. The shafts at one end (preferably that on which the smallest disk is placed) are provided with an enlargement or collar, $e$, against which the hub of this end disk abuts, and which is also provided with an annular groove, $e'$. A loose collar, F, is placed on the other end of the shafts, and set up against the hub of the last disk at that end, this collar being also provided with an annular groove, $f$. All of these annular grooves in the hubs and collars are for packing of any suitable material, and thimbles G are made of such size as to securely fill the spaces between the disks and cover the abutting ends of the hubs in such spaces, thereby protecting the packing, as shown in Fig. 4 of the drawings. These thimbles G are each provided with an aperture, $g$, about over the joint between the two hubs, through which a lubricator may be introduced, the openings being preferably provided with screw-plugs $g'$, by which they may be closed when the machine is at work. The thimbles are of course put on one after another as the disks are mounted on their respective shafts, and at each end the outer thimble covers the disk-hub and its adjacent collar. A pin, H, is put through the shaft next to the collar $e$, of sufficient length to hold the adjacent thimble in place, and at the other end a collar, I, is placed on the shaft, provided with a flange, $i$, which fits over the end of the thimble adjacent, and also with a hub, $i'$, on the outside thereof, through which a pin is passed to secure the collar to the shaft.

It will be seen from this description that the disks are left free to turn independently upon their shafts; but at the same time their bearings are securely protected from dust and dirt. The two shafts are mounted in the frame A— one on each side of the central cross-beam, and preferably with the largest disks at the inner end of each shaft. Each shaft is hinged in any suitable manner at its inner end to the central beam, while the other end is connected to its respective end beam in some suitable way to permit its adjustment back and forth. In the drawings this is accomplished by means of a strap, J, attached to each end of the beam and extending underneath the same lengthwise, leaving a space between it and the beam sufficient to receive the end of the shaft, which is of sufficient length to project somewhat beyond the beam. In this space the end of the shaft may be moved back and forth and secured in any desired position by a suitable locking-lever, K, hinged at one end to the outside of the beam, and along its under edge provided with notches $k$, which shut down over the shaft when the lever is turned down in a horizontal position, as shown in Fig. 3 of the drawings, and thereby fix the shaft in any desired position. I am thus enabled to adjust the disk-shafts at an angle to each other, the working position being shown in Fig. 1 of the drawings, in which the outer ends of the shafts are thrown backward, so that the disks stand at an inclination outward from the line of draft.

It is also obvious that the disks, as they rest upon the ground, will be inclined outward from a perpendicular in each direction from the center of the machine. Now, when the machine adjusted in this way is drawn forward, this double inclination of the disks will cause them not only to cut into the ground, as shown, but also to turn it over, instead of crowding or scraping it outward from the working-face of the disk in the ordinary way—that is, the portion of the disk back of the point of cut will have a moldboard action on account of the inclination downward of its axis of rotation. This moldboard action, whereby the soil is turned in furrows, is obtained to a greater or less degree by changing the angle of inclination of the shaft to the line of progression. When the shafts are arranged directly in line with each other—that is, perpendicular to the line of progression—the disks will not cut the soil at all, and of course there is no action; but as the shafts are inclined backward more and more the disks cut deeper and turn the soil over more completely. Obviously the several disks on the same shaft, as they are revolved by the traction, will move with a differential speed, the speed being increased as the disks grow smaller, and if it should be found that in dragging the machine rapidly over the ground the smaller disks rotate so fast as to throw the soil too much away from them they may be fastened together, so as to cause two or more, or all of them, to rotate together instead of in a differential manner. This connection may be made by means of dowel-pins L, inserted in corresponding recesses, $l$, in the adjacent diskhubs, as shown in Figs. 4 and 5 of the drawings. When the disks are left to rotate independently of each other, and thus have a differential movement, they may be very readily cleaned if there is any tendency to clog. To accomplish this I attach a scraper, M, to the back of each disk by means of short arms $m$, fastened to the disk in any suitable way, or cast thereon. The scraper is attached to the outer ends of these arms, and is arranged just a little distance from the working-face of the adjacent disk, as shown in Fig. 7 of the drawings. Obviously this disk, being smaller than the one to which the scraper is attached, will revolve more rapidly, and will therefore pass the scraper, and so any dirt adhering to the disk will be removed. The scraper and its supporting-arms must not extend outward on the back of the disk so as to interfere with the cut—that is, its outer line should not be beyond the point on the disk to which the latter enters the ground. The disk represented in Fig. 6 of the drawings, to correspond with the scale of Figs. 4, 5, and 7, is that one of the series indicated by C.

This machine is very simple and cheap in construction. Its operation in practical use is found to be very efficient and satisfactory, so that by simply giving the conical shape to the plows I am enabled to do good work, turning and pulverizing the soil with simple plain disks.

If it is desired, the disks may be made somewhat dishing, in which case a better moldboard effect will be produced than with the ordinary dishing disks all of one size. The disks may also be annular in construction, if desired, especially those of large size, the rings being attached to suitable hubs by spokes or in any other suitable way. The mounting of the shafts in the frame and the means for adjusting said shafts and fixing them in any desired position are all matters of detail, which may be accomplished by a great variety of devices without departing from the principle of my invention. The best effect is produced when the plows are arranged, as shown and described above, with the larger disks inside; but this arrangement may be reversed, if it is wished, though probably with some loss of the mold-board effect. A single series of disks may in some instances be employed, and I do not limit myself to the number of disks in a series mentioned above and shown in the drawings, as the series may contain any number desired. The adjustment of the disk-shafts may be made at the inner end thereof instead of the outer end, as shown in the drawings.

In these matters of detail in construction and special arrangement and application of the main feature of my invention I do not wish to be understood as limiting myself to a machine exactly as herein shown and described, but do wish to be understood as intending to include as my invention a series of two or more plowing-disks of different sizes having a common axis of revolution and arranged in any manner whatever, provided the disks of the series are inclined in two directions, so as to have a mold-board action, as heretofore specified.

Having thus described my invention, what I claim as new, and desire to secure by Letters Patent, is—

1. In a rotary plow, a series of revolving disks of different sizes, arranged at an angle to the line of draft, and all the disks of the series inclined in the same direction, either right or left from a perpendicular to the ground on which the series rests, substantially as and for the purposes set forth.

2. In a rotary plow, a series of revolving disks of different sizes, arranged in regular succession from the largest to the smallest, and all in the series inclined in the same direction, either right or left from a perpendicular to the horizontal plane on which the graduated series rests when laid upon the ground, substantially as and for the purposes set forth.

3. In a rotary plow, a series of disks of different sizes, mounted loosely and independently of each other on the same shaft, one end of which is adjustable back and forth to set the shaft at an angle to the line of progression, substantially as and for the purposes set forth.

4. In a rotary plow, a frame in which the plows are mounted, in combination with two shafts arranged at an angle to each other, mounted in the frame with their outer ends inclined back of their inner ends, and a series of disks of different sizes, mounted on each shaft and arranged in regular order from the largest to the smallest of the series, beginning at the inner end of each shaft, substantially as and for the purposes set forth.

5. In a rotary plow, the frame, in combination with the two shafts hinged at their inner ends to a stationary support and at their outer ends adjustable back and forth, a series of revolving disks of different sizes, mounted on each shaft and regularly graded down from the inner end of the shaft to the outer end in a substantially conical arrangement, and mechanism for adjusting and securing the outer ends of the shafts in any desired position, substantially as and for the purposes set forth.

6. The frame A, in combination with the shafts E, hinged at their inner ends to a suitable support and held loosely in guideways at their outer ends, the disks mounted on the shaft and arranged in a conical series, and the notched fastening-lever K, substantially as described.

7. The plowing-disks of different sizes, mounted loosely in a series on a supporting-shaft, in combination with the scrapers M, attached to the backs of the disks, substantially as and for the purposes set forth.

8. The supporting-shaft E, in combination with a series of disks of different sizes, mounted loosely and independently thereon, and the scrapers M, attached to the backs of the respective disks, substantially as and for the purposes set forth.

MILTON C. NILES.

Witnesses:
J. M. THACHER,
THOMAS H. PEASE.